United States Patent
Hawkins

(10) Patent No.: US 10,235,020 B2
(45) Date of Patent: Mar. 19, 2019

(54) DYNAMIC INDEX FOR A DIGITAL MAGAZINE

(71) Applicant: Flipboard, Inc., Palo Alto, CA (US)

(72) Inventor: Guy Hawkins, Palo Alto, CA (US)

(73) Assignee: Flipboard, Inc., Palo Alto, CA (US)

(*) Notice: Subject to any disclaimer, the term of this patent is extended or adjusted under 35 U.S.C. 154(b) by 472 days.

(21) Appl. No.: 14/927,458

(22) Filed: Oct. 29, 2015

(65) Prior Publication Data

US 2017/0123611 A1 May 4, 2017

(51) Int. Cl.
| | |
|---|---|
| *G06F 3/048* | (2013.01) |
| *G06F 3/0483* | (2013.01) |
| *G06F 3/0485* | (2013.01) |
| *G06F 17/21* | (2006.01) |

(52) U.S. Cl.
CPC .......... *G06F 3/0483* (2013.01); *G06F 3/0485* (2013.01); *G06F 17/212* (2013.01)

(58) Field of Classification Search
CPC .............................. G06F 3/0483; G06F 3/0485
See application file for complete search history.

(56) References Cited

U.S. PATENT DOCUMENTS

| 2011/0296344 | A1* | 12/2011 | Habib | G06F 1/1616 |
| | | | | 715/810 |
| 2013/0151974 | A1* | 6/2013 | Cho | G06F 17/212 |
| | | | | 715/733 |

OTHER PUBLICATIONS

Adobe Creative Team, "Adobe Acrobat 9 Classroom in a Book", Aug. 2008, Adobe Press, pp. 118-122,139.*

* cited by examiner

Primary Examiner — Claudia Dragoescu
(74) Attorney, Agent, or Firm — Fenwick & West LLP

(57) ABSTRACT

A solution is provided for presenting content items of a digital magazine to a user of a digital magazine server, where a dynamic index is provided to indicate which content items are currently displayed on a display of the computing device. Multiple content items of the digital magazine can be arranged in a content panel. A dynamic index is synchronized with the display region of the content panel such that when a position of the display region of the content panel changes, a dynamic index is updated to indicate the changed position of the display region of the content panel. A portion of a content item can be displayed or hidden depending on current user interaction with the display panel. The display region indicator indicates the displayed portions of the content items and their corresponding hidden portions.

20 Claims, 6 Drawing Sheets

DYNAMIC INDEX FOR A DIGITAL MAGAZINE

BACKGROUND

The disclosure generally relates to providing digital content through digital magazines, and more specifically to dynamic indexing for digital magazine.

Digital distribution channels disseminate a wide variety of digital content including text, images, audio, links, videos, and interactive media (e.g., games, collaborative content) to users. Recent development of mobile computing devices such as personal computers, smart phones, tablets, etc., enables users to access numerous content items in various forms. For example, a user can read electronic news articles, view a video clip, listen to audio, or interact with other users through a smart phone or other computing devices. However, users can be overwhelmed by the broad selection of digital content available to users, especially when lack of efficient indexing of the large volume of digital content.

SUMMARY

A computer-implemented method is disclosed for presenting content items of a digital magazine in which a dynamic index is provided to indicate which content items are currently displayed. Embodiments of the method comprise identifying a display region of a content panel in which multiple content items of the digital magazine can be arranged. Upon identifying the display region of the content panel, a display region indicator in an index panel indicates a position of the display region of the content panel. As the display region changes, the display region indicator is updated to reflect the change in the display region. For example, in various embodiments, in response to a user interaction with the display region, e.g., sliding the display region, a first portion of a first content item is hidden and a second portion of the first content item is displayed, where a first portion of a second content item is hidden and a second portion of the content item is displayed. Moreover, the display region indicator in the index panel indicates which portions of the first and second content items are hidden, and which portions of the first and second content items are displayed.

Another aspect provides a non-transitory computer-readable storage medium storing executable computer program instructions for presenting content items of a digital magazine in which a dynamic index is provided to indicate which content items are currently displayed. The computer-readable storage medium stores computer program instructions comprising instructions for identifying a display region of a content panel in which multiple content items of the digital magazine can be arranged, and indicating the display region of the content panel an in an index panel.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Configuration Overview

One embodiment of a disclosed configuration is a system (or a computer implemented method or a non-transitory computer readable medium) for presenting content items of a digital magazine in which a dynamic index is provided to indicate which content items are currently displayed on a display of a computing device. The ""digital magazine"" herein refers to an aggregation of content items that can be presented to users in a presentable format similar to the format used by print magazines. A ""content item"" herein refers to any machine-readable and machine-storable work product, such as text, image, video, audio, or a combination of thereof. Multiple content items of the digital magazine can be arranged in a content panel and multiple content items can be independent from each other, e.g., provided by different sources and presented in different formats. The content panel may be larger than a display, such that a portion of the content panel is displayed, and another portion of the content panel is hidden. The displayed portion of the content panel herein is also referred to as ""the display region"" of the content panel. A dynamic index is synchronized with the display region of the content panel such that when a position of the display region of the content panel changes, a dynamic index is updated to indicate the changed position of the display region of the content panel.

In one aspect, the display region of the content panel can be shifted such that a portion of a content item is hidden and another portion of the content item is displayed. The dynamic index indicates the position of the display region of the content panel, where a portion of a content item is hidden and another portion of the content item is displayed. The amount of shift of the display region of the content panel can"

be adjusted by a user operation, e.g., a swipe of a touch screen of the display region. A portion of a first content item and a portion of a second content item may be displayed simultaneously according to the user operation. In addition, the dynamic index indicates the portion of the first content time and the portion of the second content item are being displayed.

Example Digital Magazine System Environment

Figure 1:
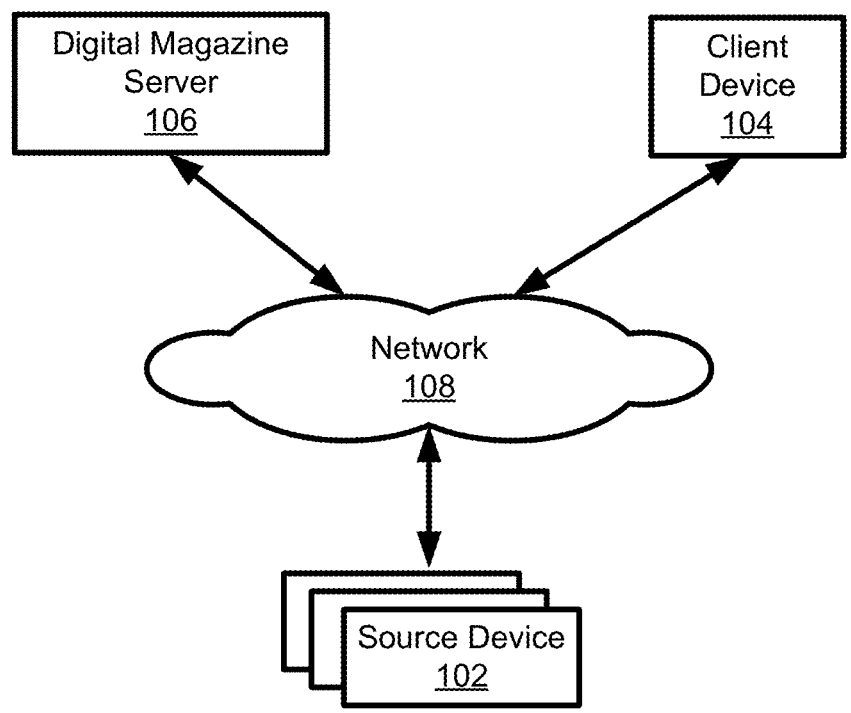
FIG. 1 is a block diagram of an embodiment of a system environment for organizing and sharing content via a digital magazine according to one embodiment.

FIG. 1 is a block diagram of a system environment 100 for presenting digital magazine with a dynamic index to a user of the digital magazine according to one embodiment. The system environment 100 shown in FIG. 1 includes one or more source devices 102, a network 108, a client device 104, and a digital magazine server 106. In alternative embodiments, different and/or additional components may be included in the system environment 100.

A source device 102 is a computing system capable of providing various types of content to a client device 104. Examples of content provided by a source device 102 include text, images, video, or audio on web pages, web feeds, social networking information, messages, or other suitable data. Additional examples of content include user-generated content such as blogs, tweets, shared images, video or audio, social networking posts, and social networking status updates. Content (e.g., stories about news events, product information, entertainment, or educational material) provided by a source device 102 may be received from a publisher and distributed by the source device 102. For convenience, content from a source device, regardless of its composition, may be referred to herein as an "article," a "content item," or as "content." A content item may include various types of sub-content items, such as text, images, and video.

The source devices 102, the digital magazine server 106 and the client device 104 communicate among each other through the network 108. The network 108 may comprise any combination of local area and/or wide area networks, using both wired and/or wireless communication systems. In one embodiment, the network 108 uses standard communications technologies and/or protocols. For example, the network 108 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 108 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 108 may be represented using any suitable format, such as hypertext markup language (HTML) or extensible markup language (XML). In some embodiments, all or some of the communication links of the network 108 may be encrypted using any suitable technique or techniques.

The client device 104 is one or more computing devices capable of receiving user input as well as transmitting and/or receiving data via the network 108. In one embodiment, the client device 104 is a conventional computer system, such as a desktop or a laptop computer. Alternatively, the client device 104 may be a device having computer functionality, such as a personal digital assistant (PDA), a mobile telephone, a smartphone or another suitable device. In one embodiment, the client device 104 executes a program (or an application) allowing a user of the client device 104 to interact with the digital magazine server 106 through the network 108. For example, an application executing on the client device 104 communicates instructions or requests for content items to the digital magazine server 106 to modify content presented to a user of the client device 104. As another example, the client device 104 executes a browser that receives pages from the digital magazine server 106 and presents the pages to a user of the client device 104. While FIG. 1 shows a single client device 104 for simplicity, in various embodiments, any number of client devices 104 may communicate with the digital magazine server 106.

The digital magazine server 106 receives content items from one or more source devices 102, generates pages in a digital magazine by processing the received content items, and serves the pages to the client device 104. To provide content items to a user, the digital magazine server 106 generates one or more pages for presentation to a user based on content items obtained from one or more source devices 102 and information describing organization and presentation of content items. For example, the digital magazine server 106 determines a page layout including various content items based on information associated with a user and generates a page including the content items arranged according to the determined layout for presentation to the user via the client device 104.

Figure 2:
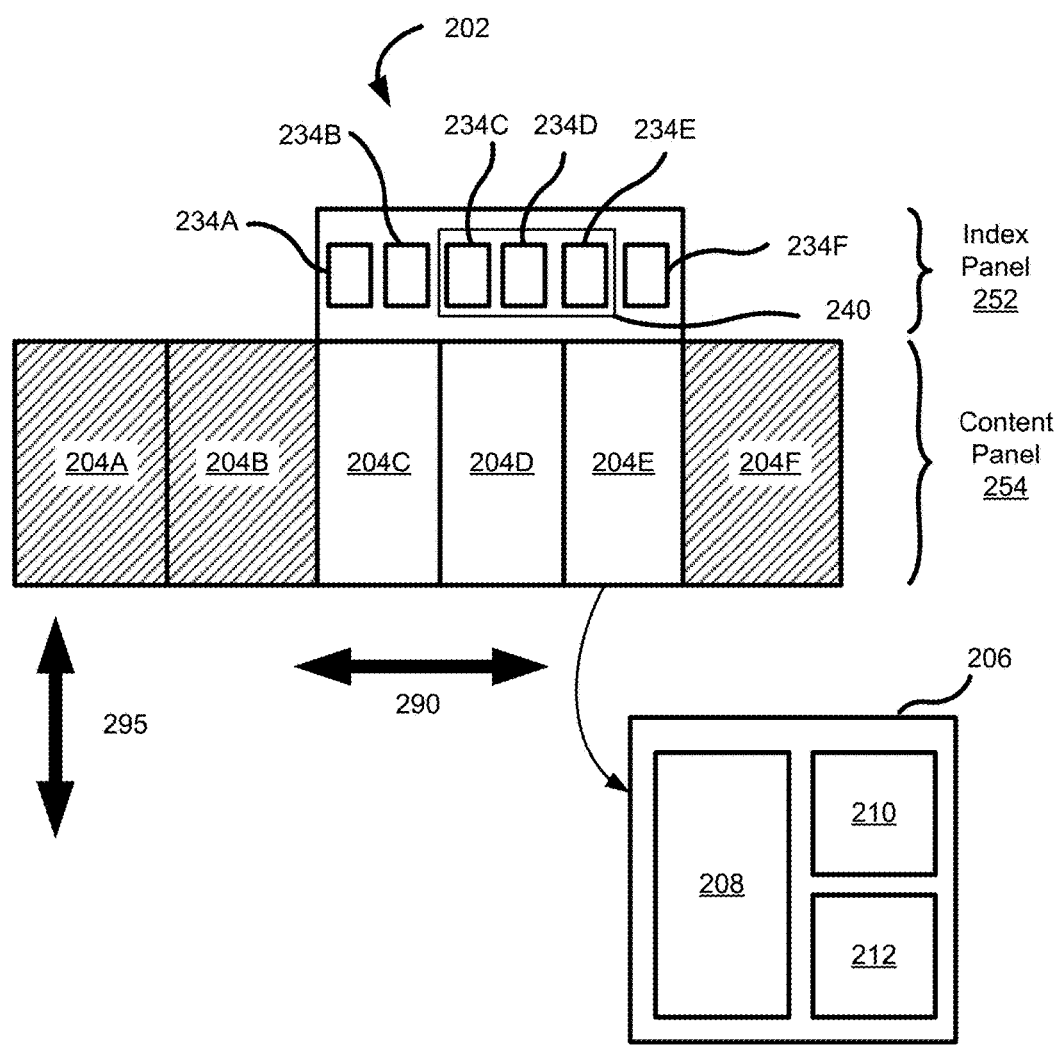
FIG. 2 is an example of a content browse page of a digital magazine with a dynamic index according to one embodiment.

In FIG. 2, an example of a content browse page 202 with a dynamic index is illustrated according to one embodiment. In one embodiment, the digital magazine server 106 may generate the content browse page 202, and transmit the content browse page 202 to the client device 104 for presentation at the client device 104. Alternatively, the digital magazine server 106 instructs the client device 104 to execute a corresponding digital magazine application, which generates the content browse page 202. In one embodiment, the content browse page 202 includes an index panel 252 and a content panel 254. The content items 204A . . . 204F (generally herein referred to as a "content item 204") are arranged in the content panel 254, where a portion of the content panel 254 may be displayed at the client device 104 and another portion of the content panel 254 may be hidden from being viewed by a user of the content browse page 202. The index panel 252 includes a dynamic index (herein also referred to as a "display region indicator 240") to indicate which content items 204 are displayed and a position of the displayed portion of the content panel 254.

The content panel 254 is an area of the content browse page 202 for presenting content items 204 to a user. The content panel 254 is divided into multiple sections, where each section is assigned to a corresponding content item 204. For example, a first section is allocated for the content item 204C presenting sports reports, a second section is allocated for the content item 204D presenting cooking recipes, and a third section is allocated for the content item 204E presenting fashion articles. The content items 204 may be arranged in a linear arrangement. Alternatively, the content items 204 are arranged in multi-dimensions array (e.g., two or three dimensions).

In one embodiment, one or more content items 204 in the content panel 254 are displayed on the display of the client device 104, while other content items 204 are hidden. In the example illustrated in FIG. 2, three content items 204C, 204D, 204E are currently displayed on the content panel 254, and content items 204A, 204B, 204F are hidden from being viewed by a user of the content browse page 202. The content panel 254 can be slid, dragged, relocated, or resized according to a user input such that position of the display region of the content panel 254 can be dynamically changed in response to the user input. Hence, content items 204 displayed may be changed according to the user input.

In one embodiment, when a content item 204, e.g., content item 204E, is selected by a user of the client device 104, a content page 206 associated with the content item 204E is presented at the client device 104. The content page 206 may include multiple sub-content items 208, 210, 212. The content page 206 may have a layout in a similar arrangement, but in a different size or ratio compared to the layout of the corresponding content item 204E presented on the content browse page 202. Alternatively, the content page 206 may have a layout in different arrangement compared to the layout of the corresponding content item 204E presented on the content browse page 202.

The index panel 252 is an area of the content browse page 202 for indicating which content items 204 are displayed and a position of the display region of the content panel 254. The index panel 252 includes indexes 234A, 234B . . . 234F (herein generally referred to as an "index 234") corresponding to content items 204A, 204B . . . 204F in the content panel 254 and the display region indicator 240 indicating which content items are displayed and a location of the display region of the content panel 254.

Each index 234 corresponds to a respective content item 204 in the content panel 254, e.g., index 234A corresponding to content item 204A in the content panel 254. Each index can be displayed as a text, image, a video or a combination thereof to represent the respective content item 204. Preferably, the indexes 234 are arranged in the same order or the same spatial arrangement as the respective content items 204 in the content panel 254. In one aspect, the index panel 252 displays indexes 234 corresponding to all of the content items 204 in the content panel 254, and a complete list of content items 204 are presented in the index panel 252. In another aspect, the index panel 252 displays a limited number of indexes 234, where indexes 234 corresponding to the content items 204 are currently displayed in the content panel.

The index panel 252 also includes a display region indicator 240 for indicating which content items are displayed in the content panel 254. The display region indicator 240 can be a rectangular box, oval, or in any shape that encompasses portions of the indexes corresponding to portions of the content items currently displayed in the content panel 254. Alternatively, the display region indicator 240 can use distinct representations (e.g., a highlight or a distinct color) for indexes corresponding to the content items currently displayed in the content panel 254. Specifically, the display region indicator 240 may be a color mask that applies a different color to a portion of texts or an image of an index 234 encompassed by a boundary of the display region indicator 240 corresponding to a boundary of the display region of the content panel 254, but the boundary of the display region indicator 240 itself is invisible. Taking FIG. 2 as an example, indexes 234C, 234D, and 234E correspond to content items 204C, 204D, and 204E respectively that are currently displayed in the content panel 254. Indexes 234C, 234D and 234E are included in the display region indicator 240; on the other hand, indexes 234A, 234B, and 234F corresponding to content items 204A, 204B, and 204F respectively are not included in the display region indicator 240 because content items 204A, 204B and 204F are not currently displayed in the content panel 254.

The display region indicator 240 also indicates a current position of a display region of the content panel 254. In one embodiment, the index panel 252 includes at least one index 234 corresponding to a content item 204 currently hidden in the content panel 254, and indexes corresponding to content items 204 displayed, where indexes are located in the similar order or arrangement as the corresponding content items in the content panel 254. Thus, a position of the display region of the content panel 254 can be inferred from a relative position among indexes corresponding to the displayed content items and ones corresponding to the hidden content items. For example, in FIG. 2, even though content items 204A, 204B, and 204F are hidden, a user will be able to determine that there are two more content items to the left of the content item 204C displayed, and one more content item to the right of the content item 204E based on the display region indicator 240 in the index panel 252.

In one embodiment, the display region indicator 240 is displayed, when a user scroll operation (e.g., slide or drag) is detected. In this embodiment, the display region indicator 240 is hidden, but responsive to determining that the user input is a scroll operation, the display region indicator 240 is displayed. After the scroll operation is executed, for example after a few seconds or a predetermined amount of time, the display region indicator 240 can be disappeared.

In one embodiment, the display region indicator 240 is constantly displayed on the index panel 252 regardless of whether the user input is detected or not.

In one embodiment, the index panel 252 and the content panel 254 are operated together such that a user input in one of the index panel 252 and the content panel 254 causes the other of the index panel 252 and the content panel to be updated. For example, in response to a user providing an input on the content panel 254 that causes a position of a display region of the content panel 254 to be changed, the index panel 252 is updated to reflect the change in the position of the display region of the content panel 254. In one aspect, the content panel 254 is shifted such that different portions of the content panel 254 are visible or invisible to a user of the content browse page 202. Similarly, a user may provide an input on the index panel 252 to cause a position of a display region of the content panel 254 to be changed, as if an input was provided on the content panel 254. The user may slide, drag, or resize the display region indicator 240 to change the display region of the content panel 254. The user may also click or select an area in the index panel 252 outside of the display region indicator 240 and cause the display region of the content panel 254 to be relocated (or jumped).

In one embodiment, the content panel 254 can be scrolled to view different content items 204 or sub-content items. In one aspect, the content panel 254 can be slid or dragged in a horizontal direction 290 to view different content items. For example, the user may slide the content panel 254 in the horizontal direction 290 to browse different content items 204, where the content items 204 are labeled as "Entertainment," "Cooking," "Finance," "News Articles," a social network site, etc., respectively. In one aspect, an individual content item 204 can be slid or dragged in a vertical direction 295 to view different sub-content items associated with the content item 204. For example, the content item 204C may be associated with "News Articles", and the user can slide the content item 204C vertically to view different news items. In one embodiment, the index panel 252 is updated to indicate which portion of the content panel 254 and the content items 204 are being displayed.

Advantageously, the content browse page 202 allows the user to access content items via the client device 104 in a format that enhances the user's interaction with and consumption of the content items. The digital magazine server 106 may present to a user content items in a format similar to the format used by print magazines. The presentation of content items by the digital magazine server 106 as described above allows a user to interact with content items from multiple source devices 102 via the client device 104 with reduced inconvenience of horizontal or vertical scrolling to access various content items.

Figure 3A:
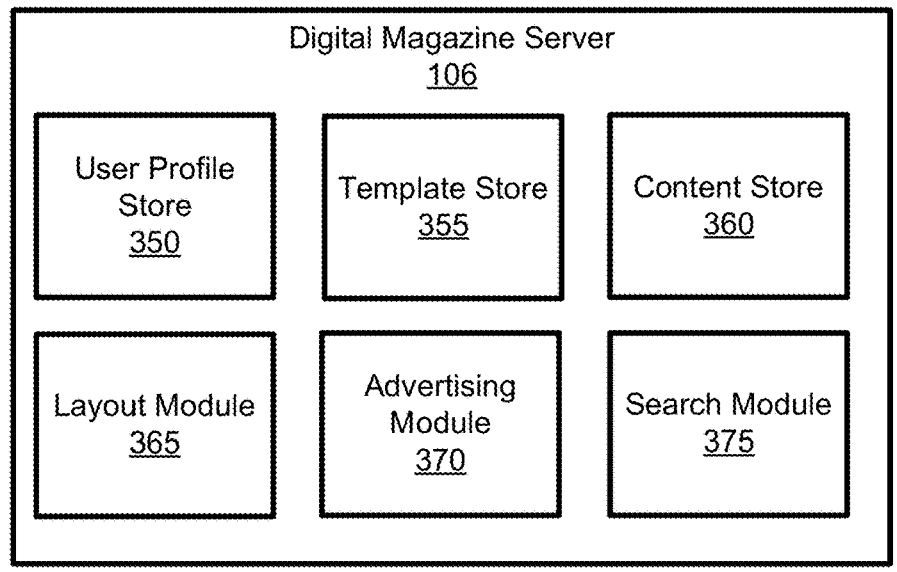
FIG. 3A is a block diagram illustrating a digital magazine server according to one embodiment.

FIG. 3A is a block diagram illustrating a digital magazine server 106 according to one embodiment. In one embodiment, the digital magazine server 106 includes a user profile store 350, a template store 355, a content store 360, a layout module 365, an advertising module 370, and a search module 375. These components operate together to generate content pages according to selected page layouts and transmit the generated content pages to the client device 104 for presentation. In other embodiments, the digital magazine server 106 may include different, fewer, or additional components.

The user profile store 350 stores user profiles. A user profile includes information about the user that was explicitly shared by the user and may also include profile information inferred by the digital magazine server 106. In one embodiment, a user profile includes multiple data fields, each describing one or more attributes of the corresponding digital magazine server user. Examples of information stored in a user profile include biographic, demographic, and other types of descriptive information, such as gender, hobbies or preferences, location, data describing interactions by a corresponding user with content items presented by the digital magazine server 106, or other suitable information.

The template store 355 includes layout (herein also referred to as "page templates") each describing a spatial arrangement of content items relative to each other on a section for presentation by a client device 104. Each section has a size (e.g., small, medium, or large) and an aspect ratio. One or more page templates may be associated with types of client devices 104, allowing content items to be presented in different relative locations and with different sizes when the content items are viewed using different client devices 104. Additionally, page templates may be associated with source devices 102, allowing a source device 102 to specify the format of sections presenting content items received from the source device 102.

In various embodiments, page templates included in the template store 355 may be defined with flexible dimensions, allowing presentation of content items to account for various sizes or dimensions of a display area in which the content items are presented. For example, a page template includes display regions specifying a percentage of a display area in which a content item is presented.

The content store 360 stores various types of digital content from the source devices 102. Examples of content items stored by the content store 360 include a page post, a status update, a photograph, a video, a link, an article, a photograph, video data, and any other type of digital content.

The layout module 365 retrieves content items from one or more source devices 102 or from the content store 360 and generates a page including the content items based on a page template from the template store 355. For example, the layout module 365 selects a page template based on previously selected templates and/or characteristics of the content items. The layout module 365 may associate the content item with a section configured to present a specific type of content item or to present content items having one or more specified characteristics.

The advertising module 370 facilitates source devices 102 or other vendors to present advertisements to a user of the client device 104. A source device 102 may provide advertisements for their products or services. An advertisement of a product or a service may be arranged in a page transmitted to the client device 104. In one approach, the advertising module 370 analyzes user preferences or history of content items being viewed by a user of the client device 104, determines a product or a service that the user is likely to be interested in, and includes the advertisement corresponding to the determined product or service in the page for transmission to the client device 104. In another approach, the advertising module 370 identifies an advertisement related to a content item displayed, and includes the identified advertisement in the page for transmission to the client device 104.

The search module 375 receives a search query from a user through the client device 104 and retrieves content items from one or more source devices 102 or from the content store 360 based on the search query. For example, content items having at least a portion of an attribute matching at least a portion of a search query are retrieved from one or more source devices 102. In one embodiment, the search module 375 generates a section of the digital magazine including the content items identified based on the search query.

Figure 3B:
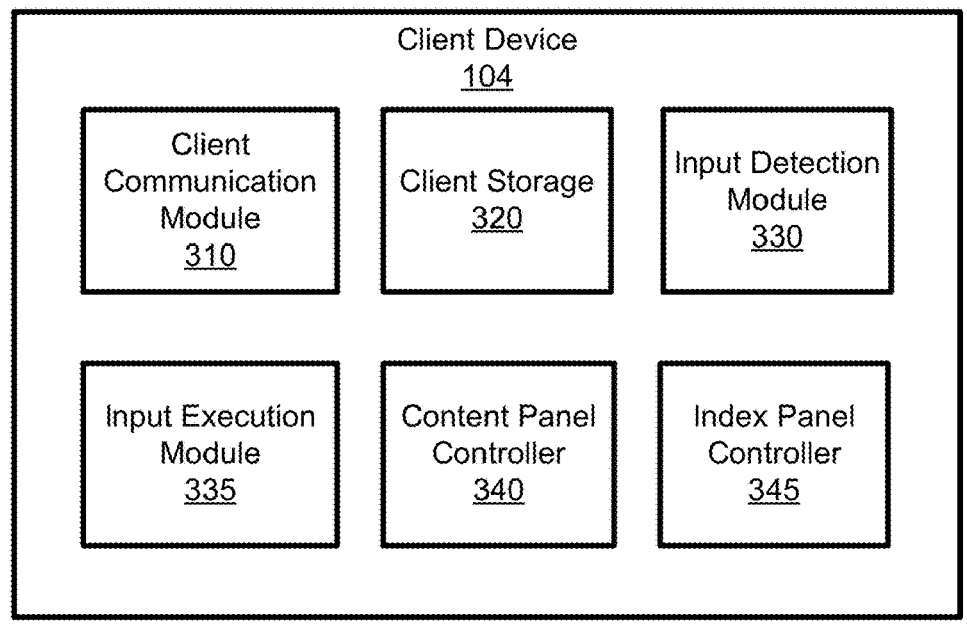
FIG. 3B is a block diagram illustrating a client device according to one embodiment.

FIG. 3B is a block diagram of a client device 104 according to one embodiment. In the embodiment illustrated in FIG. 3B, the client device 104 includes a client communication module 310, a client storage 320, an input detection module 330, an input execution module 335, a content panel controller 340, and an index panel controller 345. These components operate together to present content items in digital magazine pages to a user. In other embodiments, the client device 104 may include different, fewer, or additional components.

The client communication module 310 is a communication interface between the client device 104 and the network 108. The client device 104 can exchange data with the source devices 102 and/or the digital magazine server 106 through the client communication module 310. The client communication module 310 may receive pages from the digital magazine server 106 for presenting content items (and advertisements) to a user of the client device 104. Moreover, the client communication module 310 receives user input on changes to content items displayed, page layouts and user feedback and transmits the user input to the digital magazine server 106.

The client storage 320 is a repository for storing data generated and received by the client device 104. For example, the client storage 320 stores information for presenting content pages and content items of a digital magazine to a user of the client device 104. Other data stored at the client storage 320 includes browsing history, search history, user preference, and data access information and authorization to the digital magazine server 106.

The input detection module 330 receives an input signal from an input device (e.g., pointing device or a keyboard) coupled to the client device 104 or an input device (e.g., touch screen) embedded in the client device 104, and determines an input operation associated with the input. The input detection module 330 may analyze series or parallel input signals received at the input device to determine the details of the input operation. In one embodiment, the input is a user input to the client device 104 regarding changes to a selection of content items displayed on display panel.

In one approach, the input detection module 330 determines a type of input operation and attributes associated with the determined input operation based on the input. In one implementation, the input detection module 330 determines a selection operation in response to a mouse button being pressed or a touch screen being touched (by a finger or a stylus pen); the input detection module 330 determines a release operation in response to a mouse button being released or a touch screen being untouched from a selection operation.

The input detection module 330 determines a drag operation based on user interaction with the client device 104. For example, if selection operation is detected for a predetermined time period (e.g., 5 seconds) and a change in a coordinate of a selected area is detected during the selection operation, the input detection module 330 determines the input operation is a drag operation. For another example, if a release operation is detected and a change in the coordinate of an area to be released occurred within the predetermined time period (e.g., 2 seconds) before the end of the release operation, the input detection module 330 determines the input operation is a slide operation.

The input detection module 330 may further determine a direction, a velocity of the drag operation or of the slide operation. Additionally, the input detection module 330 may also determine other user input operations such as click, double click, and other operations as can be understood and implemented by a person in the ordinary skill in the art.

The input execution module 335 receives the determined input operation from the input detection module 330 and executes the input operation. For executing the input operation, the input execution module 335 may provide a type of operation and associated information to an executing unit, e.g., a content panel controller or a an index panel controller of the client device 104, which are described below with references to FIG. 4A and FIG. 4B. For example, for a slide operation, the input execution module 335 provides the information related to the slide operation (e.g., a sliding velocity, direction, amount of friction to apply, and etc.) to the content panel controller 340 and/or the index panel controller 345.

Figure 4A:
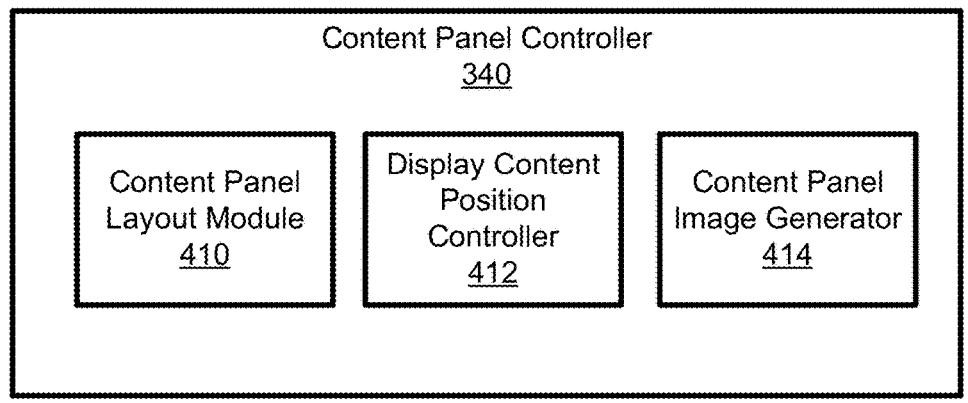
FIG. 4A is a block diagram illustrating a content panel controller of the client device according to one embodiment.

FIG. 4A is a block diagram of the content panel controller 340 according to one embodiment. The content panel controller 340 generates a content page having a display region of a content panel, e.g., the content panel 254 shown in FIG. 2. In one embodiment, the content panel controller 340 includes a content panel layout module 410, a display content position controller 412, and a content panel image generator 414. In alternative embodiments, different and/or additional components may be included in the content panel controller 340.

The content panel layout module 410 receives a page template from the client storage 320 or the template store 355 of the digital magazine server 106 through the client communication module 310. The page template has information describing arrangement of content items to be displayed in a content panel. Taking the content panel 254 shown in FIG. 2 as an example, the content panel layout module 410 obtains a list of content items to be included in the content panel 254, size, shape, location of each section of the content panel 254, and association between each content and a section in the content panel 254 from the page template. The content panel layout module 410 can modify the layout of the content panel 254 described by the received page template in a format suitable for presentation on the client device 104.

The display content position controller 412 controls a position of the display region of the content panel 254. The display content position controller 412 receives a position of a display region of the content panel 254 or information related to the position of the display region, e.g., from the input execution module 335, and updates the position of the displayed contents in the content panel 254 in accordance with the detected input operation. The display content position controller 412 provides the position of the display region of the content panel 254 to the content panel image generator 414. Additionally, the display content position controller 412 may provide the position of the display region to the index panel controller 345. The display content position controller 412 may continue to update the position, until the input operation (e.g., the slide operation) is completed or terminated.

In another embodiment, the display content position controller 412 receives information related to an input operation from the input execution module 335 and determines the position of display region of the content. Specifically, the display content position controller 412 receives the direction, slide velocity, amount of friction to apply, etc. from the input execution module 335 to determine the position of the display region of the content panel at a certain time. The display content position controller 412 provides the determined position to the content panel image generator 414 and/or the index panel controller 345.

The content panel image generator 414 generates an image of the display region of the content panel 254 based on the position indicated by the display content position controller 412 and based on the layout information of the content panel layout module 410. Specifically, the content panel image generator 414 determines which portion of the content panel 254 is to be displayed and which portion of the content panel 254 is to be hidden based on the position indicated by the display content position controller 412. Furthermore, the content panel image generator 414 generates an image of the display region of the content panel 254 according to the determined portion of the content panel 254. The image of the display region of the content panel 254 is provided to a display device (not shown) of the client device 104 for presentation. Example images of the display region of the content panel 254 are provided in FIGS. 5A and 5B.

Figure 4B:
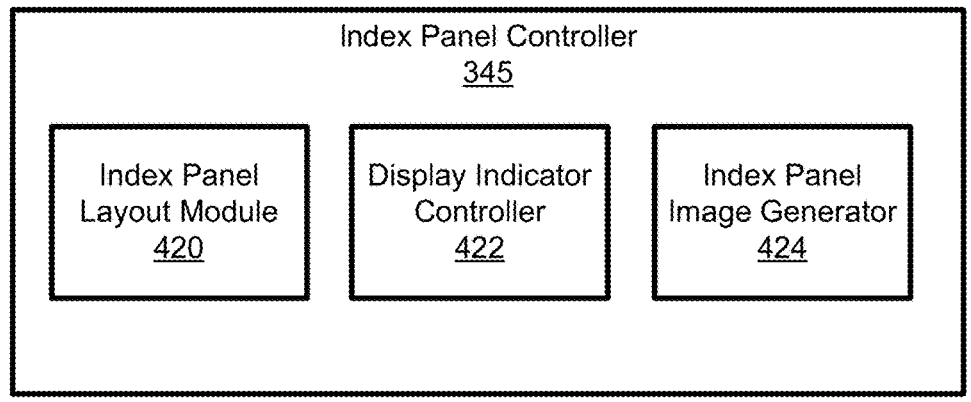
FIG. 4B is a block diagram illustrating an index panel controller of the client device according to one embodiment.

FIG. 4B is a block diagram of the index panel controller 345 according to one embodiment. The index panel controller 345 generates an image of an index panel, e.g., the index panel 252 shown in FIG. 2, indicating a position of the display region of the content panel 254. The index panel controller 345 includes an index panel layout module 420, a display indicator controller 422, and an index panel image generator 424. In alternative embodiments, different and/or additional components may be included in the index panel controller 345.

The index panel layout module 420 receives a page template from the client storage 320 or the template store 355 of the digital magazine server 106 through the client communication module 310. The page template has information describing arrangement of content items to be displayed in an index panel, e.g., the index panel 252 shown in FIG. 2. In one aspect, the index panel layout module 420 obtains a list of indexes to be included in the index panel 252, size, shape, location of each index of the index panel 252, and association between each index and content item from the page template. In another aspect, the index panel layout module 420 determines the layout of the index panel 252 based on a list of contents to be included in the content panel 254.

The display indicator controller 422 controls a position of a display region indicator, e.g., the display region indicator 240 shown in FIG. 2. The display indicator controller 422 receives information related to a position of a display region of the content panel 254, and provides the position of the display region indicator 240 to the index panel image generator 424. Additionally, the display indicator controller 422 may provide the position of the display region indicator 240 to the content panel controller 340 (or display content position controller 412). The display indicator controller 422 may continue to update the position, until the input operation or the slide operation is completed (or terminated).

In one embodiment, the display indicator controller 422 receives a position of the display region of the content panel 254 from the input execution module 335 or display content position controller 412 of the content panel controller 340 and determines a position of the display region indicator 240. The determined position can be provided to the content panel image generator 414.

In one approach, the user input changes the position of the display region of the content panel 254, and the client device 104 updates the display region indicator to reflect the change in the display region. Specifically, the display content position controller 412 determines a position of the display region of the content panel based on the user input. In addition, the content panel image generator 414 determines a position of the display region indicator based on the position of the display region. Furthermore, the content panel image generator 414 presents the updated image of the display region of the content panel, and the index panel image generator 424 presents the updated image of index panel.

In another approach, the user input changes the position of the display region indicator, and the client device 104 updates the display region of the content panel to reflect the change in the display region indicator. Specifically, the content panel image generator 414 determines a position of the display region indicator based on the user input. Moreover, the display content position controller 412 determines a position of the display region of the content panel based on the determined position of the display region indicator. Furthermore, the content panel image generator 414 presents the updated image of the display region of the content panel, and the index panel image generator 424 presents the updated image of the index panel.

In another embodiment, the display indicator controller 422 receives information related to an input operation from the input execution module 335 and determines the position of the display region indicator 240. Specifically, the display indicator controller 422 receives the direction, slide velocity, amount of friction to apply, etc. from the input execution module 335 to determine the position of the display region indicator 240 to be displayed at a certain time. The display indicator controller 422 provides the determined position of the display region indicator 240 to the index panel image generator 424 (or the content panel controller 340).

The index panel image generator 424 receives the position of the display region indicator 240 from the display content position controller 412 and generates an image of the index panel 252 based on the received position of the display region indicator 240. The index panel image generator 424 generates an image of the index panel 252 in which the display region indicator 240 indicates which content items 204 are currently displayed and a position of the display region of the content panel 254. The image of the index panel 252 is provided to a display device (not shown) of the client device 104 for presentation.

Exemplary Operation

Figure 5A:
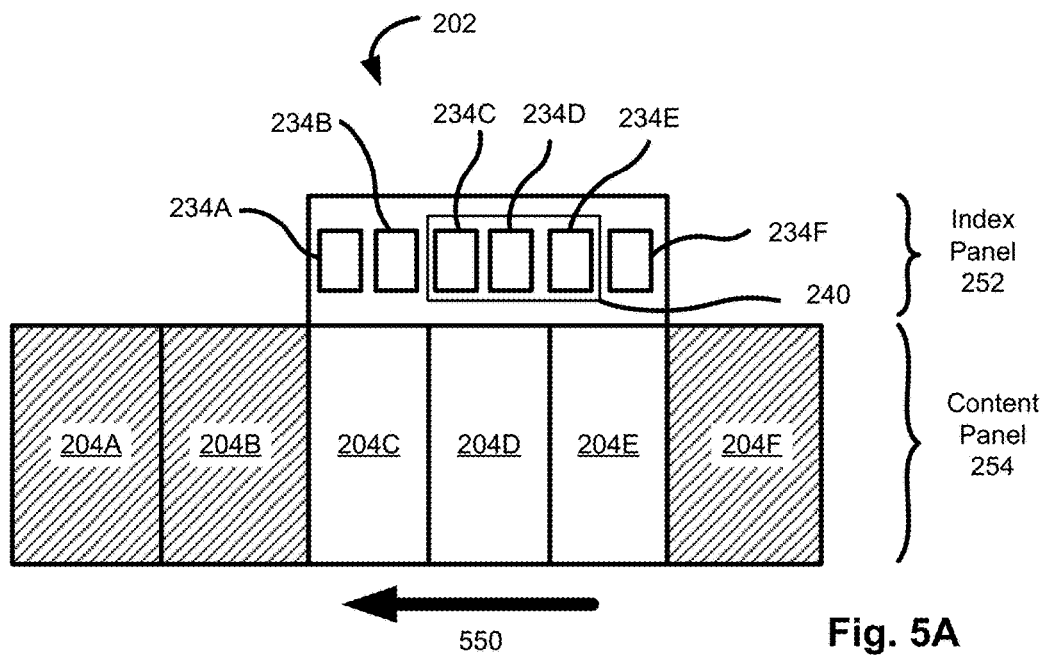
FIG. 5A illustrates an example user interface of the client device before a slide operation applied to current display of digital content according to one embodiment.

FIG. 5A illustrates an example user interface of the client device before a slide operation applied to current display of digital content according to one embodiment. For simplicity, the arrangement of content items 204, indexes 234, display region indicator 240, index panel 252, and content panel 254 in FIG. 5A are the same as the ones described in FIG. 2. In FIG. 5A, three content items, 204C, 204D and 204E, are currently displayed in the content panel 254; the corresponding indexes, 324C, 234D and 234E, are included in a portion of the index panel 252, where the portion of the index is indicated by the display region indicator 240. A user of the client device 104 slides the content panel 254 along a direction 550. The slide operation is detected and is provided to the content panel controller 340, which updates the display of the content panel 254. The slide operation is also provided to the index panel controller 345, which updates the display of the index panel 252.

Figure 5B:
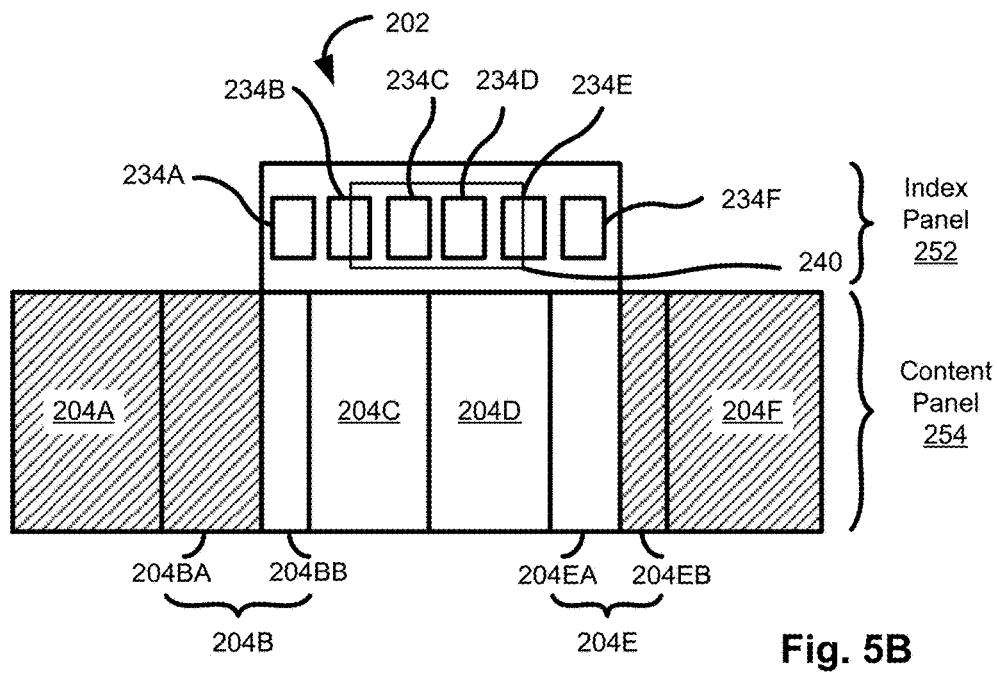
FIG. 5B illustrates an example user interface of the client device after the slide operation to the display of digital content shown in FIG. 5A according to one embodiment.

FIG. 5B illustrates an example user interface of the client device after the slide operation to the display of digital content shown in FIG. 5A according to one embodiment. As shown in FIG. 5B, the content panel 254 is shifted along the direction 550 according to the slide operation. For example, the content item 204B is partitioned into two portions: a first portion 204BA and a second portion 204BB. The content item 204B was hidden before the slide operation; after the slide operation, its first portion 204BA remains hidden, where the second portion (e.g., 204BB) becomes visible. In addition, the content item 204E is partitioned into two portions: a first portion 204EA of the content item, and a second portion 204EB, where the first portion 204EA is now displayed, where a second portion of 204EB becomes hidden.

The corresponding display of the index panel 252 is also shifted to reflect the change in the position of the portion of the content panel 254 displayed. Specifically, a first portion of the index 234B outside of the display region indicator 240 corresponding to the first portion 204BA of the content item remains hidden, and a second portion of the index 234B included in the display region indicator 240 corresponding to the second portion 204BB of the content item becomes visible. Similarly, a first portion of the index 234E included in the display region indicator 240 corresponding to the first portion 204EA of the content item remains displayed, where a second portion of the index 234E outside of the display region indicator 240 corresponding to the second portion 204EB of the content item becomes hidden.

Beneficially, the dynamic index indicates the positions of the display region of the content panel dynamically changed according to user input, e.g., slide, drag, or resize operations. The display region of the content panel can be shifted according to a user operation, thus a user may adjust a portion of a first content item displayed and a portion of a second content item displayed at a given time. The dynamic index indicates the portions of the display region of the index panel dynamically changed according to user input, e.g., slide, drag, or resize operations. Dynamically updating the display region of the content panel and the index panel of content items enables the user to effectively consume different content items in a digital magazine presented to the user.

Exemplary Method

Figure 6:
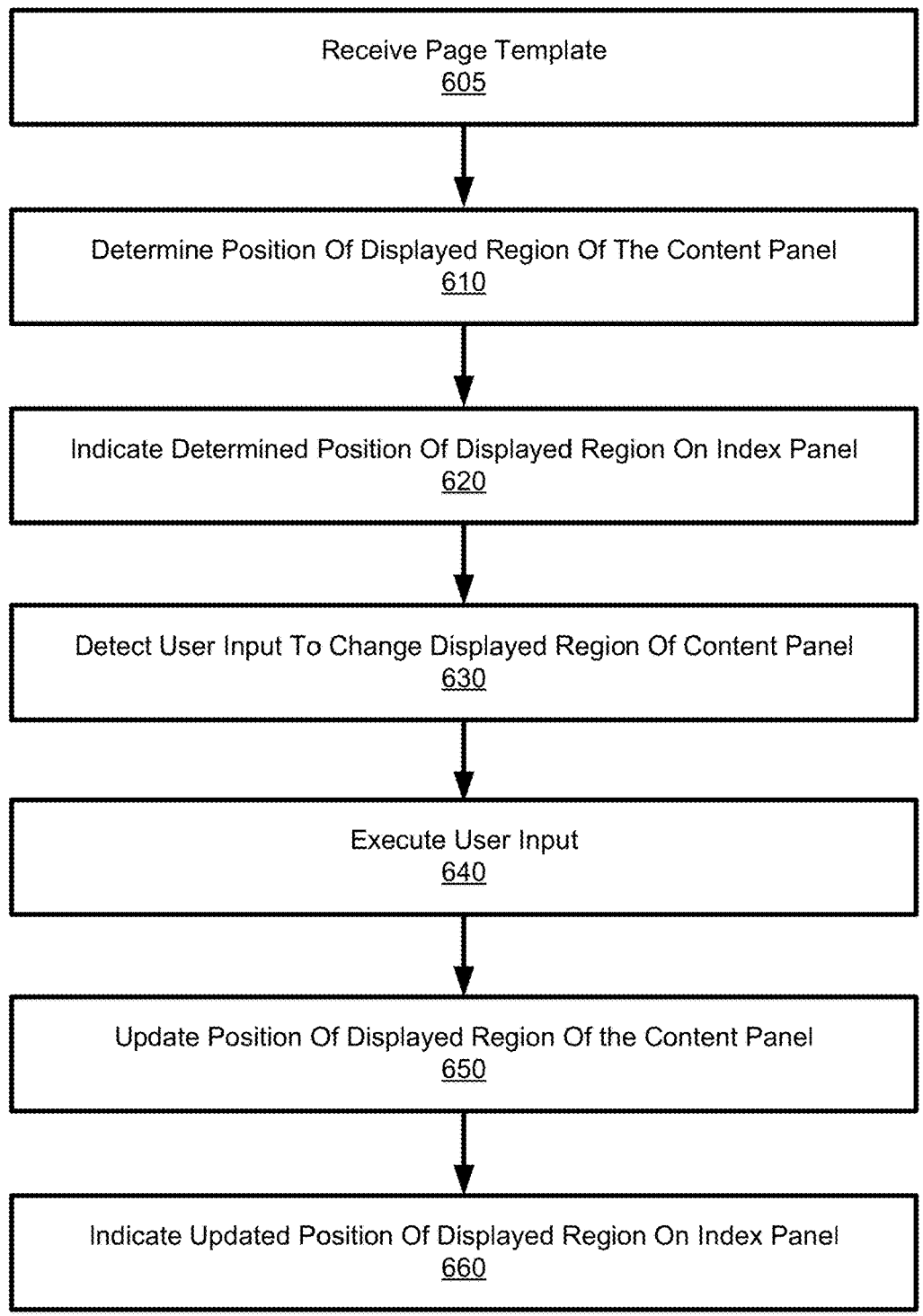
FIG. 6 is a flow chart illustrating a process for dynamically updating a display region of a content panel and a corresponding display region of an index panel in response to a user input according to one embodiment.

FIG. 6 illustrates a flow chart illustrating a process for dynamically updating a display region of a content panel and a corresponding display region of an index panel in response to a user input according to one embodiment. In the embodiment illustrated in FIG. 6, the user input is a sliding operation applied to the content panel. In one embodiment, the steps in FIG. 6 can be performed by a client device 104. In other embodiments, some or all of the steps may be performed by other entities. In addition, some embodiments may perform the steps in parallel, perform the steps in different orders, or perform different steps.

The client device 104 receives 605 a page template through the network 108 from the digital magazine server 106, where the page template provides information on how to present content items of a digital magazine to a user of the client device 104. Based on the information provided by the received template page, the content panel layout module 410 of the client device 104 determines a layout of a content panel, e.g., the content panel 254 shown in FIG. 2, and the index panel layout module 420 determines a layout of an index panel, e.g., the index panel 252 shown in FIG. 2.

The client device 104 determines 610 a position of a display region of the content panel 254. In one aspect, the display content position controller 412 receives the position of the display region of the content panel from the input execution module 335 or the display indicator controller 422. In another aspect, the display content position controller 412 receives information relating to a prior user input (e.g., direction, speed, time, etc.) and determines position of the display region of the content panel 254.

The client device 104 indicates 620 a position corresponding to the determined position of display region on the index panel 252. The display indicator controller 422 receives the position of the display region of the index panel 252 from the input execution module 335 or the display indicator controller 422. Alternatively, the display content position controller 412 receives information relating to a prior user input (e.g., direction, speed, time, etc.) and determines position of the display region of the content panel 254

The client device 104 detects 630 a user input, e.g., a slide operation, applied to the display region of the content panel. In one aspect, the input detection module 330 determines a type of input operation and attributes associated with the determined input operation. In one example, a user input to change the position of the display region of the content panel is a slide operation, a drag operation, a jump operation, or a resize operation and the input detection module 330 determines a speed, direction, and timing of the input operation.

The client device 104 executes 640 the detected user input. In one approach, the input execution module 335 receives the type of input operation and attributes associated with the determined input operation and executes the user input. To apply the user input to the display region of the content panel 254, the input execution module 335 instructs the content panel controller 340 to update 650 the position of display region of the content panel 254 according to the input operation. Similarly, the input execution module 335 instructs the index panel controller 345 to indicate 660 the updated position of the display region on the index panel 252 according to the input operation. Examples of a user interface of the client device 104 before and after a slide operation applied to current display of digital content in the content panel and the index panel can be referenced to FIG. 5A and FIG. 5B, respectively.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for presenting a digital magazine on a client device, the method comprising:
presenting an image of a display region of a content panel on a display of the client device, the content panel comprising a first content item and a second content item;
presenting an image of an index panel, the index panel comprising a first index corresponding to the first content item, a second index corresponding to the second content item, and a display region indicator indicating which portions of the first content item and the second content item are displayed; and
responsive to a user interaction with at least one of display region presentation and index panel presentation, updating the presentation of the display region and corresponding presentation of the index panel, the updated presentation of the display region comprising (i) a first portion of the first content item and (ii) a first portion of the second content item being displayed in the display region of the content panel, (iii) a second portion of the first content item and (iv) a second portion of the second content item not being displayed in the display region of the content panel, and the updated presentation of the index panel comprising (1) a first portion of the first index corresponding to the first portion of the first content item that is being displayed in the display region of the content panel being presented within the display region indicator, (2) a first portion of the second index corresponding to the first portion of the second content item that is being displayed in the display region of the content panel being presented within the display region indicator, (3) a second portion of the first index corresponding to the second portion of the first content item that is not being displayed in the display region of the content panel being presented outside of the display region indicator, and (4) a second portion of the second index corresponding to the second portion of the second content item that is not being displayed in the display region of the content panel being presented outside of the display region indicator.

2. The method of claim 1, further comprising:
determining a position of the display region of the content panel; and
indicating, by the display region indicator, the position of the display region of the content panel.

3. The method of claim 1, wherein each content item is a machine-readable and machine-storable work product comprising a plurality of sub-content items, and multiple content items are independent from each other in terms of sources and presentation formats, and wherein one of the multiple content items is vertically scrollable to view different ones of a plurality of sub-content items associated with the one of the multiple content items, and the content panel is horizontally scrollable to view different content items of the multiple content items.

4. The method of claim 1, wherein a portion of the image of the index panel not displayed in the display region indicator corresponding to a region of the content panel indicates which portions of the first content item and the second content item are hidden.

5. The method of claim 1, further comprising:
receiving an input signal to change one of a position of the display region of the content panel and a position of display region indicator; and
updating the position of the display region of the content panel and the position of display region indicator according to the input signal.

6. The method of claim 5, further comprising:
determining an updated position of the display region of the content panel based on an input signal to change a position of the display region of the content panel;
determining an updated position of the display region indicator according to the updated position of the display region;
presenting an updated image of the display region of the content panel according to the updated position of the display region of the content panel; and
presenting an updated image of the index panel according to the updated position of the display region indicator.

7. The method of claim 6, wherein the input signal corresponds to one of a sliding operation, dragging operation, or resizing of the display region of the content panel.

8. The method of claim 5, further comprising:
receiving an input signal to change a position of the display region indicator;
determining an updated position of the display region indicator according to an input signal;
determining an updated position of the display region of the content panel based on the updated position to change a position of the display region indicator; and
presenting an updated image of the display region of the content panel according to the updated position of the display region of the content panel; and
presenting an updated image of the index panel according to the updated position of the display region indicator.

9. The method of claim 1, wherein the display region indicator is a color mask that applies a different color to a portion of texts or an image of an index encompassed by a boundary of the display region indicator corresponding to a boundary of the display region of the content panel.

10. The method of claim 1, wherein a content item is a machine-readable and machine-storable work product comprising a plurality of sub-content items, and multiple content items are independent from each other in terms of sources and presentation formats.

11. A non-transitory computer-readable storage medium storing executable computer program instructions for presenting a digital magazine on a client device, the computer program instructions comprising instructions for:
presenting an image of a display region of a content panel on a display of the client device, the content panel comprising a first content item and a second content item;
presenting an image of an index panel, the index panel comprising a first index corresponding to the first content item, a second index corresponding to the second content item, and a display region indicator indicating which portions of the first content item and the second content item are displayed; and
responsive to a user interaction with at least one of display region presentation and index panel presentation, updating the presentation of the display region and corresponding presentation of the index panel, the updated presentation of the display region comprising (i) a first portion of the first content item and (ii) a first portion of the second content item being displayed in the display region of the content panel, (iii) a second portion of the first content item and (iv) a second portion of the second content item not being displayed in the display region of the content panel, and the updated presentation of the index panel comprising (1) a first portion of the first index displayed in the index panel corresponding to the first portion of the first content item that is being displayed in the display region of the content panel being presented within the display region indicator, (2) a first portion of the second index displayed in the index panel corresponding to the first portion of the second content item that is being displayed in the display region of the content panel being presented within the display region indicator, (3) a second portion of the first index corresponding to the second portion of the first content item that is not being displayed in the display region of the content panel being presented outside of the display region indicator, and (4) a second portion of the second index corresponding to the second portion of the second content item that is not being displayed in the display region of the content panel being presented outside of the display region indicator.

12. The computer-readable storage medium of claim 11, further comprising computer program instructions for:
determining a position of the display region of the content panel; and
indicating, by the display region indicator, the position of the display region of the content panel.

13. The computer-readable storage medium of claim 11, wherein each content item is a machine-readable and machine-storable work product comprising a plurality of sub-content items, and multiple content items are independent from each other in terms of sources and presentation formats, and wherein one of the multiple content items is vertically scrollable to view different ones of a plurality of sub-content items associated with the one of the multiple content items, and the content panel is horizontally scrollable to view different content items of the multiple content items.

14. The computer-readable storage medium of claim 11, wherein a portion of the image of the index panel not displayed in the display region indicator corresponding to a region of the content panel indicates which portions of the first content item and the second content item are hidden.

15. The computer-readable storage medium of claim 11, further comprising computer program instructions for:
receiving an input signal to change one of a position of the display region of the content panel and a position of display region indicator; and
updating the position of the display region of the content panel and the position of display region indicator according to the input signal.

16. The computer-readable storage medium of claim 15, further comprising computer program instructions for:
determining an updated position of the display region of the content panel based on an input signal to change a position of the display region of the content panel;

determining an updated position of the display region indicator according to the updated position of the display region;

presenting an updated image of the display region of the content panel according to the updated position of the display region of the content panel; and presenting an updated image of the index panel according to the updated position of the display region indicator.

17. The computer-readable storage medium of claim 16, wherein the input signal corresponds to one of a sliding operation, dragging operation, or resizing of the display region of the content panel.

18. The computer-readable storage medium of claim 15, further comprising computer program instructions for:

receiving an input signal to change a position of the display region indicator;

determining an updated position of the display region indicator according to an input signal;

determining an updated position of the display region of the content panel based on the updated position to change a position of the display region indicator; and presenting an updated image of the display region of the content panel according to the updated position of the display region of the content panel; and presenting an updated image of the index panel according to the updated position of the display region indicator.

19. The computer-readable storage medium of claim 11, wherein the display region indicator is a color mask that applies a different color to a portion of texts or an image of an index encompassed by a boundary of the display region indicator corresponding to a boundary of the display region of the content panel.

20. The computer-readable storage medium of claim 11, wherein a content item is a machine-readable and machine-storable work product comprising a plurality of sub-content items, and multiple content items are independent from each other in terms of sources and presentation formats.

* * * * *

UNITED STATES PATENT AND TRADEMARK OFFICE
CERTIFICATE OF CORRECTION

PATENT NO.        : 10,235,020 B2
APPLICATION NO.   : 14/927458
DATED             : March 19, 2019
INVENTOR(S)       : Guy Hawkins Page 1 of 1

It is certified that error appears in the above-identified patent and that said Letters Patent is hereby corrected as shown below:

In the Claims

Column 16, Line 33, In Claim 12, before "computer-readable", insert --non-transitory--
Column 16, Line 39, In Claim 13, before "computer-readable", insert --non-transitory--
Column 16, Line 50, In Claim 14, before "computer-readable", insert --non-transitory--
Column 16, Line 55, In Claim 15, before "computer-readable", insert --non-transitory--
Column 16, Line 63, In Claim 16, before "computer-readable", insert --non-transitory--
Column 17, Line 9, In Claim 17, before "computer-readable", insert --non-transitory--
Column 17, Line 14, In Claim 18, before "computer-readable", insert --non-transitory--
Column 18, Line 9, In Claim 19, before "computer-readable", insert --non-transitory--
Column 18, Line 15, In Claim 20, before "computer-readable", insert --non-transitory--

Signed and Sealed this
Twenty-second Day of October, 2019

Andrei Iancu
*Director of the United States Patent and Trademark Office*